(12) United States Patent
Kitscha et al.

(10) Patent No.: US 6,244,544 B1
(45) Date of Patent: Jun. 12, 2001

(54) METHOD AND APPARATUS FOR HOLDING A CAPACITOR WITHOUT SEPARABLE FASTENERS

(75) Inventors: John Kitscha, Brookfield; Jim Pomes, Whitefish Bay, both of WI (US)

(73) Assignee: MagneTek, Inc., Los Angeles, CA (US)

( * ) Notice: Subject to any disclaimer, the term of this patent is extended or adjusted under 35 U.S.C. 154(b) by 0 days.

(21) Appl. No.: 09/253,199

(22) Filed: Feb. 19, 1999

(51) Int. Cl.$^7$ ................................ G12B 9/00; H01G 2/02; H01G 2/10
(52) U.S. Cl. ............................ 248/27.3; 361/535
(58) Field of Search ................... 29/453; 174/52.4; 361/535, 536, 537; 248/27.3, 318, 689

(56) References Cited

U.S. PATENT DOCUMENTS

| | | | |
|---|---|---|---|
| 1,398,373 | * 11/1921 | Grasser et al. . | |
| 2,627,359 | * 2/1953 | Woodward . | |
| 3,511,982 | * 5/1970 | Salter . | |
| 4,198,671 | 4/1980 | Donigan et al. | 361/306 |
| 4,356,987 | 11/1982 | Schmid | 248/73 |
| 4,360,848 | 11/1982 | Noutko et al. | 361/15 |
| 4,390,219 | * 6/1983 | Beehler . | |
| 4,414,615 | 11/1983 | Szeker et al. | 362/264 |
| 4,712,162 | 12/1987 | Quiogue | 361/417 |
| 4,791,539 | 12/1988 | Ewing | 362/226 |
| 4,937,718 | 6/1990 | Murray | 362/431 |
| 5,314,149 | 5/1994 | Pim et al. | 248/56 |
| 5,420,748 | 5/1995 | Ryu | 361/537 |
| 5,493,158 | 2/1996 | Daniels | 310/68 |
| 5,750,935 | * 5/1998 | Stevens . | |

FOREIGN PATENT DOCUMENTS

| | | | |
|---|---|---|---|
| 2 046 534 | * 11/1980 | (GB) . | |
| 4-010607 | * 1/1992 | (JP) . | |
| 6-089832 | * 3/1994 | (JP) . | |
| 7-283068 | * 10/1995 | (JP) . | |

* cited by examiner

*Primary Examiner*—I Cuda Rosenbaum
*Assistant Examiner*—Eric Compton
(74) *Attorney, Agent, or Firm*—Waddey & Patterson; Mark J. Patterson

(57) ABSTRACT

A capacitor holder for mounting capacitors used in electronics assemblies into a fixture, as well as mounting other types of components in other panels. The capacitor holder includes a support for receiving the capacitor and a cover for covering the capacitor. The cover and the support are attached to each other without the use of separable fasteners. Typically, snap-fit tabs depending from the cover are used to attach the cover to the support with a capacitor there between to form an assembly. The assembly is mounted into a fixture panel without the use of separable fasteners. In another typically embodiment, the mounting members are push-in and twist or push-in and snap-fit members integral with the cover. Thus, the capacitor is mounted within a fixture without separable fasteners. A method of aligning the capacitor within the panel is also disclosed.

23 Claims, 8 Drawing Sheets

METHOD AND APPARATUS FOR HOLDING A CAPACITOR WITHOUT SEPARABLE FASTENERS

BACKGROUND OF THE INVENTION

The present invention relates generally to mounting brackets. More particularly it relates to a mounting structure used to mount capacitors used in motor drives. Present mounting systems generally consist of sheet metal clamps that grip around the body of the capacitor and bolt to an assembly panel with the use of threaded fasteners.

U.S. Pat. No. 4,712,162 (Quiogue) discusses the requirement for a variety of clamping brackets to mount capacitors of varying sizes into electronic controls or fixtures. Quiogue discloses a hold-down strap to compensate for the variety of clamping bracket sizes and designs used. The hold-down strap uses screw and nut fasteners, as do most clamping brackets.

U.S. Pat. No. 4,937,718 (Murray) discloses a mounting bracket for receiving and mounting the capacitor to a support surface with screw and nut fasteners. The mounting bracket in Murray has a deformable plane intersecting a second deformable plane. The first plane section is secured to the support surface to exert a downward spring force upon the second plane or surface. The second plane has a central opening for physically engaging the capacitor at an angle.

The disadvantage of these and other systems is that they require many threaded fasteners and thus require more time and cost to assemble. Each bracket generally has at least two threaded fasteners. And each threaded fastener typically has a minimum of two pieces, the nut, and the bolt; generally a locking washer of some type is required. Thus, the time and cost to assemble a unit increases geometrically with the number of capacitors.

What is needed, then, is a device that will mount a capacitor in a motor drive or electronic assembly without requiring any threaded or separable fasteners. The device should have the capability to align the capacitor terminals in a desired orientation.

SUMMARY OF THE INVENTION

This invention relates to a capacitor holder for mounting a capacitor used in motor drives and electronic fixtures. This invention is of particular use for mounting a capacitor used with a motor drive or electronic assembly into a panel support, typically a sheet metal panel. Specifically, it accomplishes the mounting of the capacitor without the use of separable fasteners, thus saving assembly time and manufacturing costs.

An embodiment of the invention consists of an injection molded plastic cover that is installed over the top of the capacitor. A metal clip is then pressed over the bottom of the capacitor and snapped into the plastic cover to form an assembly including the capacitor holder and the capacitor. Once assembled, the capacitor holder is installed into the panel. The installation procedure, preferably, consists of either a push-in and twist or a push-in and snap-fit procedure, depending on the model of capacitor holder being used.

Both the push-in and twist and snap-fit procedures are adapted to accommodate a plurality of panel opening thicknesses.

It will be apparent that although the invention is describe in relation to mounting a DC bus capacitor, the invention is adaptable to mounting other types of components in other types of fixtures and panels including mounting high intensity discharge capacitors An object of this invention is to provide a mounting device for a DC bus capacitor.

Another object of this invention is to provide a capacitor holder for motor drives which does not require separable fasteners to mount the capacitor in a fixture panel.

Another object of this invention is to provide a capacitor holder which aligns capacitor terminals in a desired orientation in the fixture panel.

A further object of the invention is to provide a capacitor holder which reduce the time to assemble to the fixture, and thus saves manufacturing costs.

Another object of this invention is to provide a device which reduces the likelihood of explosion due to improper capacitor orientation.

Yet another object is to provide a capacitor holder which guarantees a polarity match.

BRIEF DESCRIPTION OF THE DRAWINGS

FIG. 7a top view of the cover shown in FIG. 7.

DESCRIPTION OF THE PREFERRED EMBODIMENTS

Figure 1A:
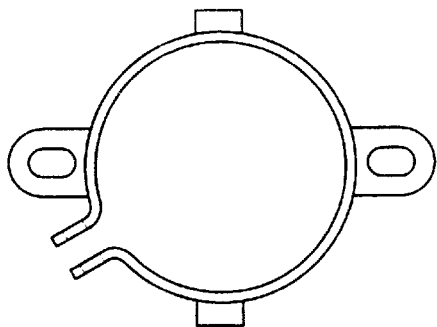
FIGS. 1a and 1b show a prior art clamp bracket requiring screw and nut fasteners.

The applicants' invention will be best understood when considered in light of the following description of the preferred embodiments of the invention, as illustrated in the attached drawings wherein like reference numerals and characters refer to like parts.

Figure 1B:
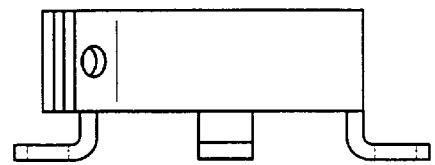
Figure 2A:
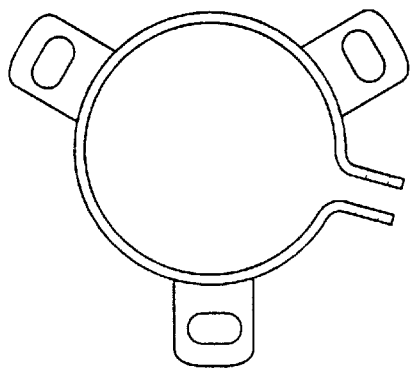
FIGS. 2a and 2b show a other embodiment of a clamp bracket requiring screw and nut fasteners.
Figure 2B:
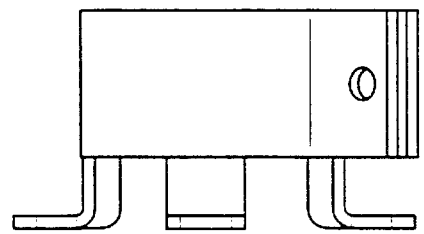

FIGS. 1a and 1b show a prior art clamp bracket used to mount capacitors in a panel. The clamp bracket requires screw and nut fasteners. FIGS. 2a and 2b show a similar clamp mounting bracket using more screw and nut fasteners than the mounting bracket shown in FIGS. 1a and 1b. Due to the multiplicity of fasteners required to mount a single capacitor, the assembling time increases dramatically as the number of capacitors to be installed in an electronic assembly increase.

Figure 3:
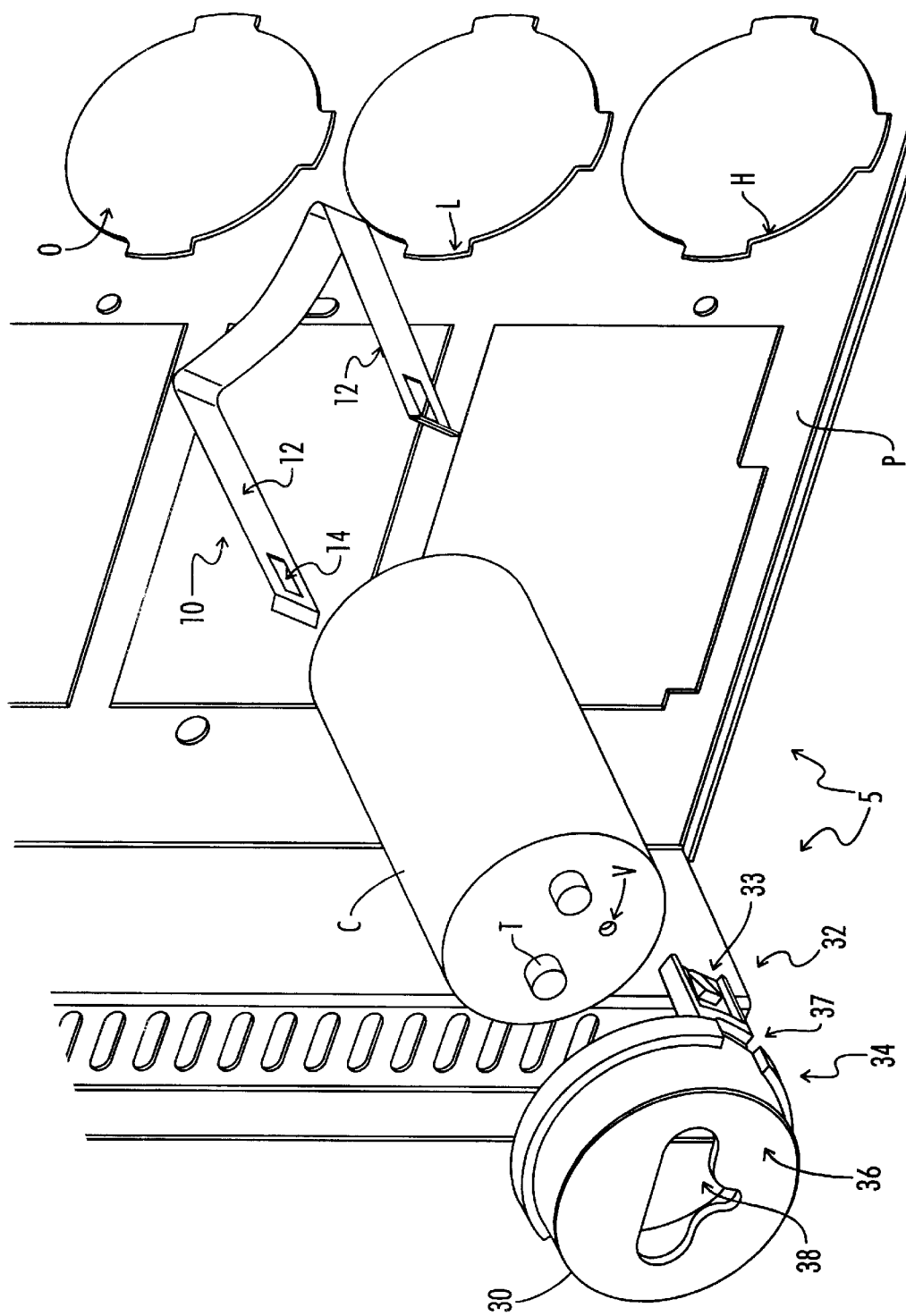
FIG. 3 shows an exploded view of the invention.

FIG. 3 shows an exploded view of the invention, a capacitor holder 5, prior to installation in a panel P having a panel opening O for receiving a capacitor C. The capacitor C includes a capacitor top and a capacitor bottom. Terminals T extend upward from the capacitor top and a capacitor venting cap V is defined within the capacitor top.

The capacitor holder 5 includes a support 10 and a cover 30. The support 10 shown in FIG. 3 is a U-shaped bracket having upright ends 12. The upright ends 12 can easily be varied to accommodate different lengths of capacitors from different vendors. The upright ends 12 include slots 14 adapted to snap-fit mate with the cover 30. Cover 30, as shown in FIG. 3, includes mount attachments 34, and a top surface 36, the top surface 36 defines an opening 38. The cover top surface 36 also defines a venting cap cutout 42. This is best seen if FIG. 6a. In one embodiment, the venting cap cutout 42 and the cover opening 38 form a unitary opening. The opening 38 receives the capacitor terminals T and aligns the capacitor C relative to the cover 30. This is the configuration shown in FIG. 6a. Other conventional designs will be apparent to those skilled in the art. The mount attachments 34, as shown in FIG. 3, include integral push-in and twist members 37.

Figure 7:
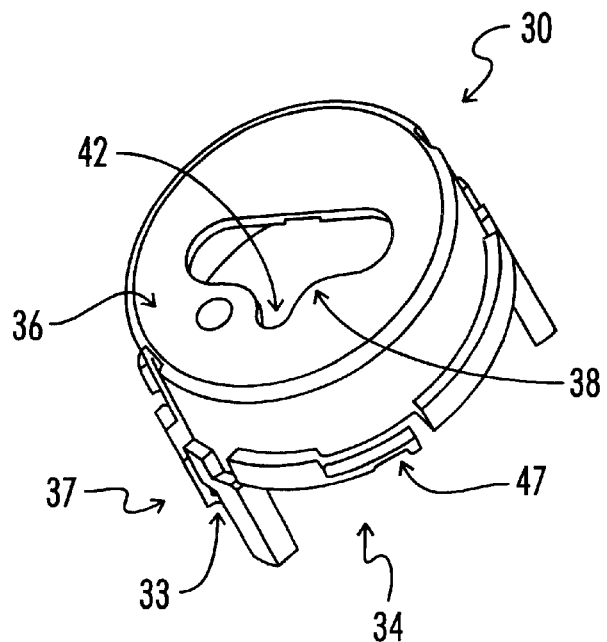
FIG. 7 shows a perspective view of a cover which uses a push-in and twist-locking member to mount the capacitor in a panel.
Figure 7A:
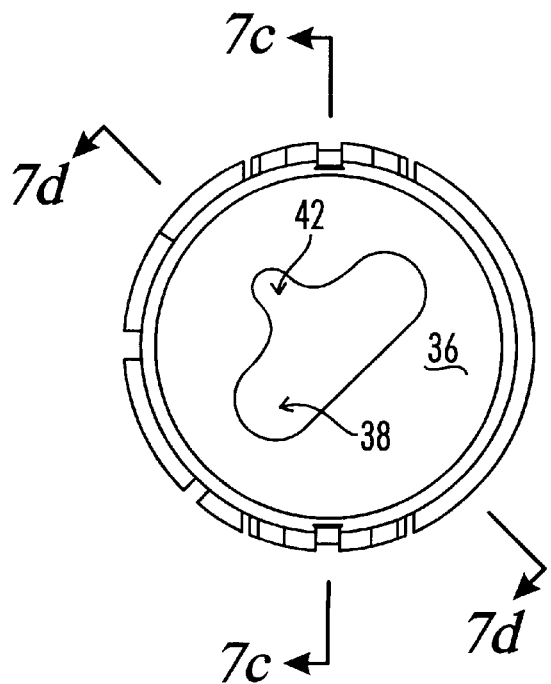
Figure 7B:
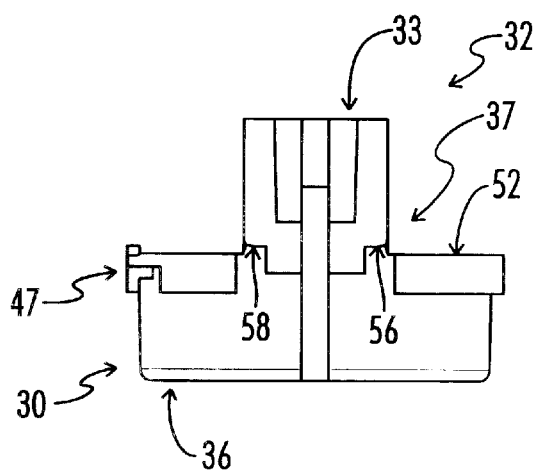
FIG. 7b shows a side view of the cover shown in FIG. 7.

Another push-in twist embodiment is shown in FIG. 7b. In FIG. 7b, a lower rim 52 depends from a cover top surface 36. The tabs 33 extending from the cover top surface 36 include a first shoulder 56 opening in a first direction and a second shoulder 58 opening in a second direction opposite to the first direction. The first shoulder 56 and the second shoulder 58 are in spaced relation to the lower cover rim 52 such that the tabs 33 may be pushed in to a panel opening O whereby the lower cover rim 52 rests on the panel P and the cover 30 may then be twisted clockwise to accommodate a first panel thickness H or twisted counter-clockwise to mate with a second panel thickness L. Thus the panel is held in place between the either the first attachment shoulder 56 or second attachment shoulder 58 and the lower cover rim 52. The tabs 33 in this embodiment do double duty as cover support attachments and mount attachments.

The push-in and twist members 37 shown in FIGS. 7 and 7b also include a locking member 47 which prevents the cover 30 from rotating too far in the panel opening O. Push-in and twist members 37 are used to mount the capacitor C in the panel opening O. The opening 38 is used to align the capacitor terminals T in relation to the cover 30. The venting cap cutout 42 is also used to visually align the cover with the capacitor. A conforming feature 41, shown in FIG. 6f, used to allow capacitor venting, in the case where the capacitor is not assembled properly.

The cover 30 shown in FIG. 3 includes tabs 33 extending from the cover 30 adapted to snap-fit mate with the U-shaped brackets 10. Thus, when assembled and installed, the capacitor holder 5 aligns the capacitor C in a desired alignment in the panel P.

Figure 4:
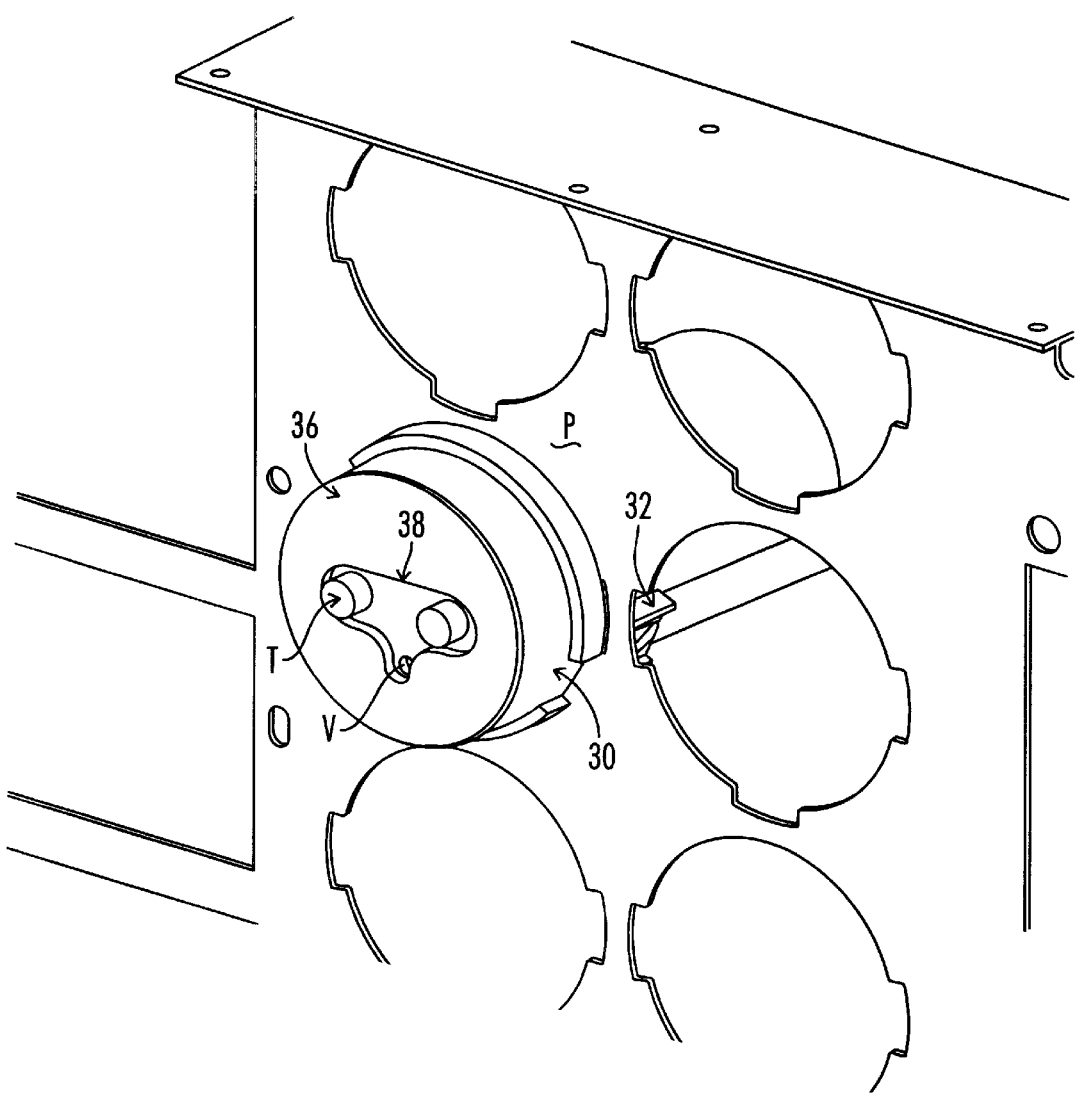
FIG. 4 shows the invention assembled and installed into a sheet metal panel.

So, another attachment 34 may be used with multiple panel thicknesses. Typically the mount attachment 34 is adapted to accommodate both 14 gage and 16 gage sheet metal panels. FIG. 4 shows the capacitor holder 5 assembled and mounted in the panel P. Capacitor terminals T are shown projecting through the opening 38 in the top surface 36 of the cover 30.

Figure 5:
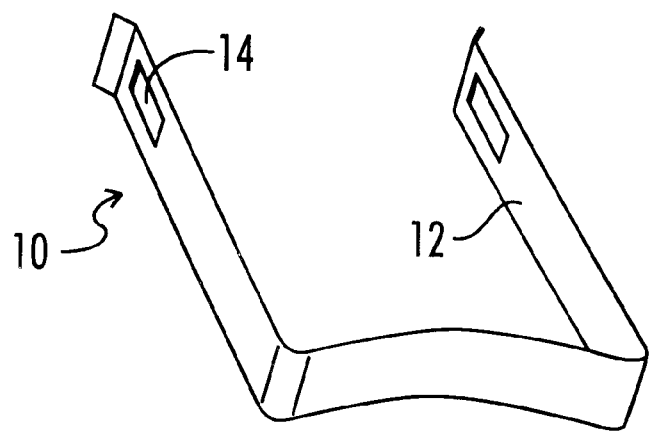
FIG. 5 shows a perspective view of a support clip.
Figure 5A:
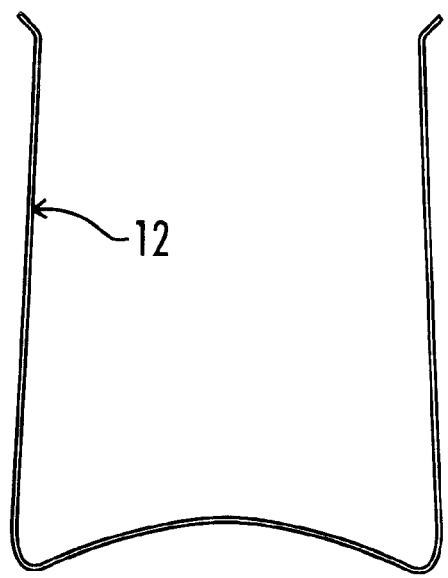
FIG. 5a shows a plan view of the support clip shown in FIG. 5.
Figure 5B:
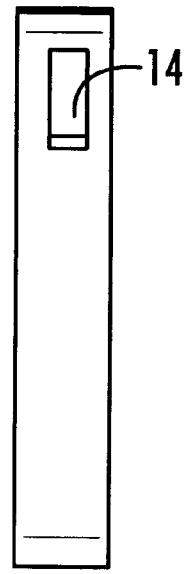
FIG. 5b shows a side view of the support clip shown in FIG. 5.

FIG. 5 shows a perspective view of a U-shaped bracket support 10 for supporting the capacitor C and mating with the cover 30. The U-shaped bracket 10 depicted includes upright ends 12. The upright ends include slots 14 for attaching the support 10 to the cover 30. FIGS. 5a and 5b show a front and side view of the U-shaped bracket, respectively.

Figure 6:
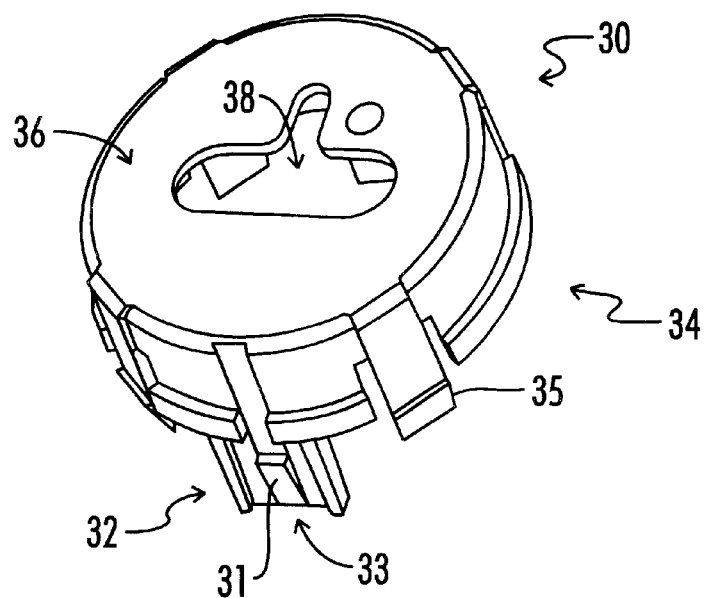
FIG. 6 shows a perspective view of a cover which uses a push-in and snap-fit locking member to mount the capacitor in a panel.

FIG. 6 shows a cover 30 for covering the capacitor C. Tabs 33 extend from the cover 30 to attach to a capacitor holder support 10. The model of capacitor holder shown in FIG. 6 uses snap-fit attachments. The cover 30 shown includes a plurality of mount attachments 34, the mount attachments 34 including snap-fit tabs 35 for snap-fit mounting the capacitor C into the panel P and aligning the cover 30 in a proper orientation in the panel P. The snap-fit tabs 35 are also referred to as snap-fit members 35. In one embodiment shown in FIG. 6c and FIG. 6d, the cover 30 includes snap-fit members 35 adapted to mate with a panel having a first thickness H and snap-fit members 39 adapted to fit with a panel having a second thickness L. For example, the snap-fit members 35 and 39 are adapted to mate with 14 and 16 gage sheet metal panels respectively, in one embodiment.

The cover 30 includes a top surface 36 and an opening 38 defined in the top surface 36 to align the capacitor C with respect to the cover 30. Also shown in FIG. 6 is a pair of cover support attachments 32 depending from the cover 30 top surface 36. The pair of cover support attachments 32 include tabs 33 adapted to mate with the support 10 upright 12. In one embodiment the tabs 33 include snap-fit elements 31 adapted to mate with the upright support element 12 and slot 14. Thus, the capacitor C is properly aligned the panel P.

Figure 6A:
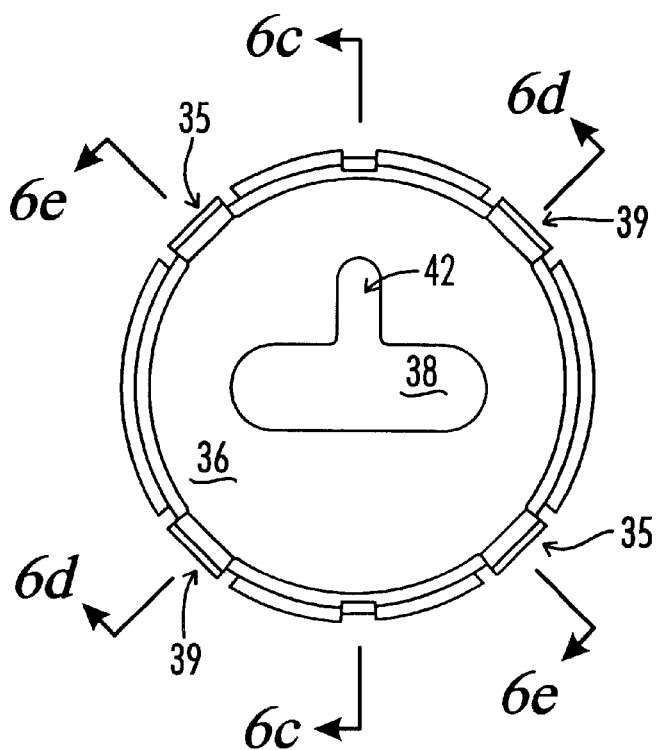
FIG. 6a shows a plan view of the cover shown in FIG. 6.
Figure 6B:
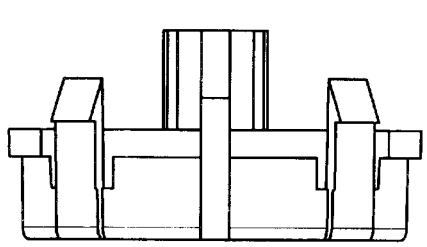
FIG. 6b shows a side view of the cover shown in FIG. 6.
Figure 6C:
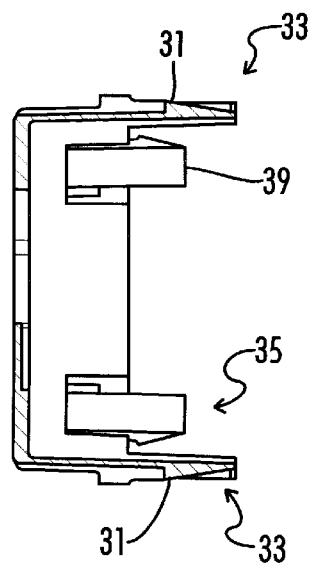
FIG. 6c shows a section view of the cover shown in FIG. 6a cut along section line AA.
Figure 6D:
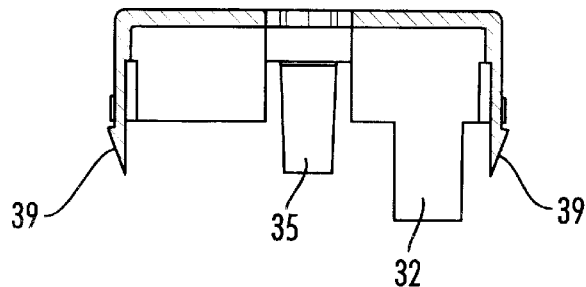
FIG. 6d shows a section view of the cover shown in FIG. 6a cut along section line BB.
Figure 6E:
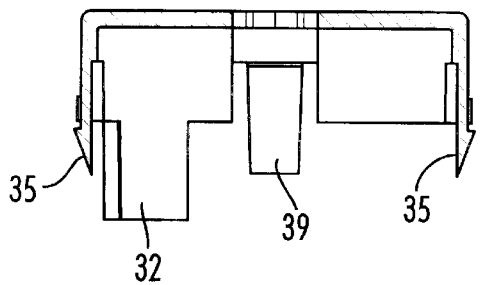
FIG. 6e shows a section view of the cover shown in FIG. 6a cut along section line CC.
Figure 6F:
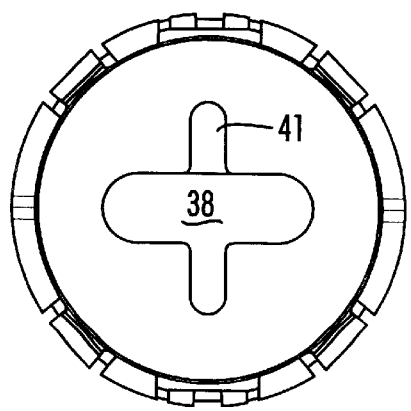
FIG. 6f shows a bottom view of the cover shown in FIG. 6.

FIG. 6a is a top view of the cover shown in FIG. 6 showing section lines AA, BB, and CC. FIG. 6a also shows two pair the location of a plurality of mount attachments. The plurality of mount attachments include two pair of snap-fit members 39 and 35 respectively. The snap-fit members 39 and 35 allow the cap cover to engage, or mate with, a first and second thickness of sheet metal panel H, and L. Venting cap cutout 42 is also depicted. FIG. 6b is a side view of the cover shown in FIG. 6. FIG. 6c shows a section view of the cover 30 cut along section line AA. FIG. 6d shows a section view cut along section line BB. FIG. 6e shows a section view cut along section line CC. FIG. 6f shows a bottom view of the cover 30 shown in FIG. 6. It shows a conforming feature 41 used to allow capacitor venting, in the case where the capacitor is not assembled properly. The features have typically any conventional set of complementary or conforming bumps, impressions, and the like.

FIG. 7 shows a perspective view of another embodiment of the cover 30. The cover 30 shown in FIG. 7 uses push-in and twist members 37 to mount the capacitor C in the panel P. The push-in and twist members 37 run along the periphery of cover 30 in this embodiment. A lower rim 52 extends from the cover top surface 36. A first shoulder or attachment support shoulder 56 is in space relation to the lower rim 52 such that a panel opening having a first thickness may be mated with the first support attachment shoulder 56. The first attachment shoulder 56 opens outward in a first direction. A second attachment shoulder 58 opens outward in a second direction opposite from the first direction. The second support attachment shoulder 58 is also in fixed space relation to the lower rim 52. However, it defines a channel to receive a panel opening O having a second thickness L whereas a channel between the first attachment shoulder 56 and the lower rim 52 accommodates a first thickness H. Thus, the capacitor may be inserted into a panel opening O and the cover 30 rotated clockwise to engage one panel opening thickness, and rotated counter-clockwise to engage another panel opening thickness. In the embodiment shown in FIG. 7b, the mounting attachments and the cover support attachments are integral with the cover. The cover 30 includes a top surface 36 defining an opening 38 for aligning the capacitor C.

Figure 7C:
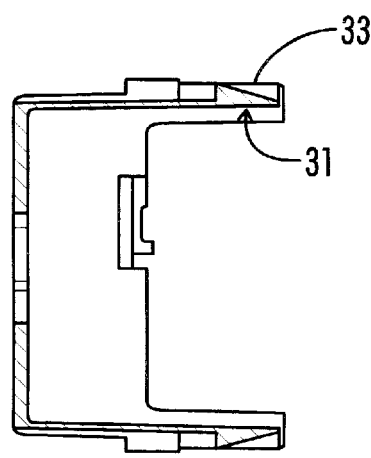
FIG. 7c shows a section view of the cover shown in FIG. 7a cut along section line AA.
Figure 7D:
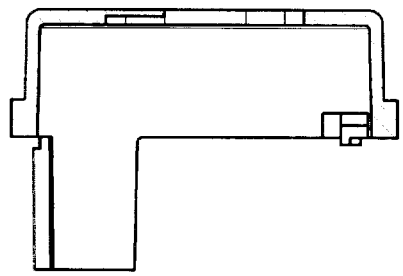
FIG. 7d shows a section view of the cover shown in FIG. 7a cut along section line BB.
Figure 7E:
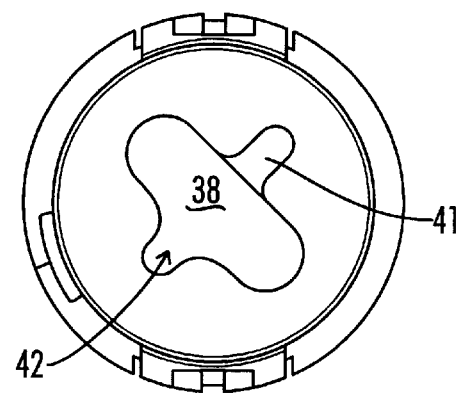
FIG. 7e shows a bottom view of the cover shown in FIG. 7.
Figure 7F:
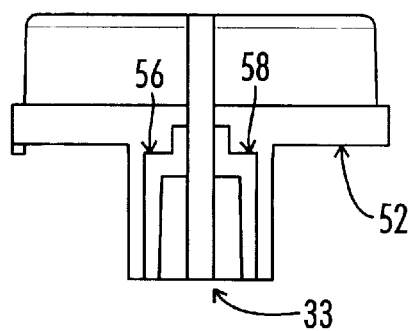
FIG. 7f shows a side view of the cover shown in FIG. 7 including support attachment shoulders.

FIG. 7a is a plan view of the cover 30 and showing section lines AA and BB. FIG. 7b is a side view of the cover 30 shown in FIG. 7. FIG. 7c is a section view of the cover 30 shown in FIG. 7a cut along section line AA. FIG. 7c shows a snap-fit attachment member 33 more clearly. Also seen more clearly is the snap-fit element 31 which is included in the snap-fit attachment number 33. Snap-fit elements 31 are also referred as tab snap-fit elements 31 because snap-fit attachment 33 is also referred to as a tab snap-fit member 33. The snap-fit attachment member 33 is used to attach the cover 30 to the support 10. FIG. 7d shows a section view of the cover 30 in FIG. 7a cut along section line BB. FIG. 7e shows a bottom view of the cover 30 shown in FIG. 7.

In one of the embodiments, the cover 30 is formed using a plastic injection molding process, and the cover support attachment members 32 are snap-fit tabs 33 depending from the cover 30. The mounting members 34 are either a push-in and twist 37 or a push-in and snap-fit 35 configuration.

Also, typically the support cover attachments 32 are integral with the cover 30, as are the mount attachments 35 and 39. Generally the mount attachments and the push-in and twist 37 are integral as well. Other conventional variations will be apparent to those skilled in the art of fasteners. In the preferred embodiment, the support 10 is a U-shaped bracket, preferably of stainless steel. The U-shaped bracket has upright ends 12 which include snap-fit support attachments 14 adapted to mate with cover support attachment snap-fit tabs 33.

Thus, although there have been described particular embodiments of the present invention of a new and useful "Method and Apparatus for Holding a Capacitor Without Separable Fasteners," it is not intended that such references be construed as limitations upon the scope of this invention except as set forth in the following claims.

What is claimed is:

1. A capacitor holder for mounting a capacitor into a panel having a thickness defining a generally circular opening, the capacitor having a capacitor bottom and a generally circular capacitor top, the capacitor top defining a venting cap and the capacitor top further including polarized terminals projecting therefrom; said capacitor holder comprising:

a support having a lower portion shaped to receive the capacitor bottom and an upright member extending from the lower portion of the support toward the capacitor top; and a cover shaped to cover the capacitor top, said cover including a pair of cover support attachments and a plurality of mount attachments, said cover support attachments arranged in positions around the cover to releasably engage corresponding engagement elements positioned on the support unright member to attach said cover to said support, and said mount attachments having portions extending through the panel opening at predetermined positions in relation to the panel opening to releasably attach said cover to the panel in a fixed orientation around the panel opening so that when the holder and capacitor are assembled in the panel, the capacitor terminals are aligned in a predetermined polarized relationship with reference to the panel opening.

2. The capacitor holder of claim 1, wherein said cover includes a top surface, said top surface defining an opening therein positioned on the cover to align with and expose the capacitor terminals when the holder and capacitor are assembled in the panel.

3. The capacitor holder of claim 2, wherein the cover top surface includes a venting cap cutout positioned on the cover to expose the venting cap when the holder and capacitor are assembled in the panel.

4. The capacitor holder of claim 1, wherein the portions of said mount attachments that extend through the panel opening comprise snap-fit members positioned around a periphery of the cover.

5. The capacitor holder of claim 1, wherein the mounting attachments include a plurality of spacing sections arranged peripherally around the cover and defining spacing corresponding to different panel dimensions whereby rotation of the cover will position the spacing sections to fit a desired one of a plurality of panel opening thicknesses.

6. The capacitor holder of claim 4, wherein the plurality of snap-fit members comprises:

a first pair of snap-fit members extending through the opening a first predetermined distance to correspond to a first panel opening thickness; and a second pair of snap-fit members extending through the opening a second predetermined distance to correspond to a second panel opening thickness.

7. The capacitor holder of claim 1, wherein said mount attachments include a plurality of push-in and twist members positioned around the cover to engage the panel around the panel opening.

8. The capacitor holder of claim 7, wherein the plurality of push-in and twist members comprise members having different predetermined dimensions to fit a plurality of panel thicknesses.

9. The capacitor holder of claim 8, wherein the plurality of push-in and twist members comprises a pair of push-in and twist members positioned around the cover so that the cover can twist clockwise to mate with a first panel opening thickness, and twist counter-clockwise to mate with a second panel opening thickness.

10. The capacitor holder of claim 9, wherein said push-in and twist members are integral with said cover.

11. The capacitor holder of claim 1, wherein the mount attachments are integral with the cover.

12. The capacitor holder of claim 1, wherein:

said cover includes a top surface; and said cover support attachments include a pair of tabs extending downward from said cover top surface.

13. The capacitor holder of claim 12, wherein each of said tabs extending from said cover includes a snap-fit element.

14. The capacitor holder of claim 12, wherein:

the cover includes a lower rim extending the cover top surface;

each tab includes a first shoulder parallel to the cover lower rim and opening in a first direction, and a second shoulder parallel to the cover lower rim and opening in a second direction, opposite the first direction; and each shoulder is in a respective fixed spaced relation to the lower cover rim such that the cover can be twisted clockwise to engage a panel opening having a first thickness, and twisted counter-clockwise to engage a panel opening having a second thickness.

15. The capacitor holder of claim 12, wherein said upright comprises a pair of upright ends, the pair of upright ends adapted to mate with the pair of tabs depending from the cover top surface.

16. The capacitor holder of claim 15, wherein each of the pair of upright ends defines a slot to snap-fit mate with the tabs.

17. The capacitor holder of claim 15, wherein said cover top defines an opening therein adapted to receive the terminals of the capacitor.

18. The capacitor holder of claim 17, wherein cover top surface further defines a venting cap cutout.

19. The capacitor holder of claim 18, wherein the venting cap cutout opens out onto the cover top surface opening.

20. The capacitor holder of claim 17, wherein said plurality of mount attachments include a pair of snap-fit members positioned around the cover to mate with the panel opening.

21. The capacitor holder of claim 17, wherein said mount attachments include a pair of push-in and twist members adapted to mate with the panel opening.

22. The capacitor holder of claim 1, wherein the cover comprises:

a top surface defining an opening positioned to expose the capacitor terminals; and the top surface further defining a venting cap cutout.

23. The capacitor holder of claim 22, wherein the venting cap cutout and the top surface opening form a unitary opening.

* * * * *